United States Patent [19]

Endres et al.

[11] Patent Number: 5,227,020
[45] Date of Patent: Jul. 13, 1993

[54] PROCESS FOR REGENERATING WASTEPAPER USING A DOUBLE LAYER HYDROXIDE FORMED IN SITU

[75] Inventors: Helmut Endres, Duesseldorf; Maria Liphard, Essen; Klaus Hornfeck, Mettmann; Andreas Arnold, Langenfeld; Guenter Geismar, Krefeld, all of Fed. Rep. of Germany

[73] Assignee: Henkel Kommanditgesellschaft auf Aktien, Duesseldorf, Fed. Rep. of Germany

[21] Appl. No.: 761,985
[22] PCT Filed: Mar. 15, 1990
[86] PCT No.: PCT/EP90/00422
§ 371 Date: Sep. 23, 1991
§ 102(e) Date: Sep. 23, 1991
[87] PCT Pub. No.: WO90/11402
PCT Pub. Date: Oct. 4, 1990

[30] Foreign Application Priority Data
Mar. 23, 1989 [DE] Fed. Rep. of Germany ....... 3909568

[51] Int. Cl.$^5$ ................................................ D21C 5/02
[52] U.S. Cl. .............................................. 162/8
[58] Field of Search ................ 162/5, 8, 181.2, 181.4, 162/181.5

[56] References Cited

U.S. PATENT DOCUMENTS 5,037,508  8/1991  Hyder et al. ................ 162/DIG. 4

FOREIGN PATENT DOCUMENTS 12304  1/1977  Japan ..................................... 162/8

OTHER PUBLICATIONS

Abstract Bulletin of the Paper Chemistry, 6493u, vol. 49, No. 7, Jan. 1979.

*Primary Examiner*—Karen M. Hastings
*Attorney, Agent, or Firm*—Ernest G. Szoke; Wayne C. Jaeschke; Real J. Grandmaison

[57] ABSTRACT

In a process for processing waste paper, aqueous suspensions of pulp are treated with cationic layer compounds precipitated in situ. The separated printing inks, fillers and/or unwanted substances are then removed from the fibrous suspensions in a known manner by flotation or washing out.

20 Claims, No Drawings

PROCESS FOR REGENERATING WASTEPAPER USING A DOUBLE LAYER HYDROXIDE FORMED IN SITU

BACKGROUND OF THE INVENTION

1. Field of the Invention

This invention relates to a process for regenerating wastepaper and to the use of cationic layer compounds precipitated in situ for regenerating wastepaper.

2. Discussion of Related Art

"Deinking" is the removal of printing inks from wastepaper fiber suspensions. Deinking processes essentially comprise two steps, namely:

1. refining the wastepaper, i.e. fiberizing in water in the presence of the chemicals required for detachment of the printing ink particles and
2. removal of the detached printing ink particles from the fiber suspension.

The second step can be carried out by washing or flotation (Ullmanns Encyclopädie der technischen Chemie, 4th Edition, Vol. 17, pages 570–571 (1979)). In flotation, which utilizes the difference in wettability between printing inks and paper fibers, air is forced or drawn through the fiber suspension. Small air bubbles attach themselves to the printing ink particles and form a froth at the surface of the water which is removed by savers.

The deinking of wastepaper is normally carried out at alkaline pH values in the presence of alkali metal hydroxides, alkali metal silicates, oxidative bleaches and surfactants at temperatures in the range from 30° to 50° C. Soaps and/or fatty alcohol polyglycol ethers are often used as surfactants which are responsible for the detachment and separation of the printing inks (Ullmanns Encyclopädie der technischen Chemie, 4th Edition, Vol. 17, pages 571–572 (1979)).

In recent years, conventional printing ink systems, for example based on nitrocellulose, maleate resins and/or shellac, which contain esters and/or ketones, for example ethyl acetate and/or methyl ethyl ketone, or alcohols as solvent, have been increasingly replaced by water-dilutable printing inks for reasons of pollution control. Another reason for the increasing use of water-dilutable printing inks lies in the non-inflammability of water which eliminates the need for the expensive safety systems which normally have to be installed in the printing works where solvent-containing printing inks are used. Most water-dilutable printing inks contain as binder component anionic polymers, for example polymers containing carboxyl groups, of which the neutralization with bases makes the printing inks dilutable with water. However, water-dilutable printing inks have the major disadvantage that they can only be removed completely inadequately, if at all, with the surfactants typically present in the deinking liquor (Das Papier 42, V 84–V 88 (1988)). The result of this is that, hitherto, the wastepaper printed with water-dilutable printing inks, which is accumulating in ever-increasing quantities, is not recycled and, hence, is also not available as a wastepaper raw material for newsprint and sanitary papers.

Through the increasing constriction of water circuits in the paper industry, there has been a considerable increase in the concentration of ionic and/or nonionic, inorganic and/or organic substances soluble and/or colloidally dissolved in water. These substances, which are known as "trash" in the paper industry, on the one hand pollute the wastewater and, on the other hand, adversely affect paper manufacture, paper quality and the effectiveness of cationic auxiliaries (Wochenblatt für Papierfabrikation 1984, 37–48). Starch, casein, polyvinyl alcohol, polymer dispersions, carboxymethyl celluloses and/or printing ink binders are examples of such trash.

The problem addressed by the present invention was to provide a process for regenerating wastepaper with which it would be possible to remove printing inks and, more particularly, water-dilutable printing inks, fillers and/or trash from fiber suspensions.

Cationic layer compounds, which are also referred to in the literature as "double-layer hydroxides" (R. Allmann "Doppelschichtstrukturen mit brucitähnlichen Schichtionen . . . " in Chimia 24, 99–108 (1970)) may be characterized by the following general formula

in which M(II) represents at least one divalent metal cation, M(III) represents at least one trivalent metal cation and $A^{z-}$ represents anions of monobasic and/or polybasic acids, x is a number of 0.01 to 0.5, n is a number of 0 to 20 and z corresponds to the number of charges of the anions. According to DE-OS 20 61 156, these layer compounds may be prepared by various methods, for example by adding an aqueous solution containing divalent and trivalent metal cations in the molar ratio represented by x in the above formula as salts of the desired acid $H_zA$ with stirring to an alkali metal hydroxide, preferably sodium hydroxide, at a pH value in the range from 9 to 12. The layer compound formed is removed, washed with water and dried. A well-characterized representative of this class of substances is hydrotalcite which occurs as a mineral in nature or may even be synthetically produced and which is a magnesium-aluminium hydroxocarbonate having the approximate composition

of which the structure has been determined by X-ray photography (R. Allmann and H.P. Jepsen, "Die Struktur des Hydrotalcits" in N. Jahrb. Mineral. Monatsh. 1969, 544–551). However, printing inks and also fillers and/or trash cannot be satisfactorily removed from paper fibers with these dried and powdered cationic layer compounds. Poor results in the removal of printing inks, fillers and/or trash from wastepapers are also obtained where paste-like cationic layer compounds of the above composition which may be produced in accordance with DE 38 38 532 and which have a water content of at least 30% by weight, as determined after drying for 4 hours at 110° C., are used.

However, it has surprisingly been found that printing inks, more particularly water-dilutable printing inks, and also fillers and/or trash can be effectively removed from fiber suspensions with cationic layer compounds of the above composition which are precipitated in situ in the fiber suspensions.

DESCRIPTION OF THE INVENTION

Other than in the operating examples, or where otherwise indicated, all numbers expressing quantities of ingredients or reaction conditions used herein are to be understood as modified in all instances by the term "about" .

Accordingly, the present invention relates to a process for regenerating wastepaper which is characterized in that aqueous stock suspensions are treated with layer compounds precipitated in situ which have the following general composition

$M(II)_{1-x}M(III)_x(OH)_2(A^{z-})_{x/z} \cdot n\, H_2O$ in which M(II) represents at least one divalent metal cation, M(III) represents at least one trivalent metal cation and $A^{z-}$ represents anions of monobasic and/or polybasic acids, x is a number of 0.01 to 0.5, n is a number of 0 to 20 and z corresponds to the number of charges of the anions, and the detached printing ink particles, fillers and/or trash are subsequently removed from the fiber suspensions in known manner by flotation or washing.

The present invention also relates to the use of cationic layer compounds of the above composition precipitated in situ for regenerating wastepaper.

The in situ precipitation of cationic layer compounds of the above composition is carried out by adding salts of divalent metal cations and salts of trivalent metal cations in solid form or preferably in the form of aqueous solutions to the stock suspensions either successively or simultaneously at temperatures in the range from 20° to 60° C. Suitable salts of divalent metal cations are, in particular, alkaline earth metal nitrates, chlorides, carbonates, sulfates, phosphates and/or polyphosphates, such as magnesium nitrate, calcium nitrate, magnesium chloride and/or magnesium sulfate. The salts of trivalent metal cations used in accordance with the invention are, in particular, alkali metal aluminates, sulfates, nitrates and/or chlorides, preferably alkali metal aluminates, for example sodium aluminate. In a particularly preferred embodiment, salts of divalent or trivalent metal cations contain anions of monobasic, dibasic and/or tribasic acids. The molar ratio of divalent metal cations to trivalent metal cations is preferably between 20:1 and 1:1. Trivalent metal cations are preferably used in quantities of 0.3 to 2% by weight, based on air-dry paper stock.

Air-dry paper stock means that an equilibrium state of internal moisture has been established in the paper stock. This equilibrium state is dependent on the temperature and the relative humidity of the air.

In many cases, the removal of printing inks, fillers and/or trash from fiber suspensions can be improved by using cationic layer compounds precipitated in situ in conjunction with $C_{10-22}$ fatty acids, for example Olinor ® 4010, a product of Henkel KGaA, polymers, for example polyacrylamides and/or polydimethylaminoethyl methacrylate, and/or copolymers of the type described, for example, in DE 38 39 479, such as copolymers of dimethylaminoethyl methacrylate, methacrylic acid and ethyl acrylate.

The stock suspensions preferably have an alkaline pH value and, more particularly, a pH value of 8 to 10 which is optionally adjusted by addition of alkali metal hydroxides, for example sodium hydroxide and/or potassium hydroxide.

In the presence of cationic layer compounds precipitated in situ, various types of printing inks, more particularly water-dilutable printing inks for example rotary newsprint inks, book printing inks, offset printing inks, illustration intaglio printing inks, flexographic and packaging intaglio printing inks, can be removed from printed wastepaper, for example newspapers, magazines, computer paper, journals, brochures, forms, telephone directories and/or catalogs. The wastepaper thus treated is distinguished by a very high degree of whiteness and has a distinctly reduced filler content. In addition, it is possible by the process according to the invention to remove trash from the fiber suspensions by flotation or washing. Problems attributable to these constituents in the papermaking process, particularly where cationic paper auxiliaries are used, and adverse effects on paper quality are thus considerably reduced.

Printed wastepaper is disintegrated in a pulper in the form of an aqueous solution typically containing 0.5 to 1.0% by weight 100% hydrogen peroxide, 0.5 to 2.5% by weight 99% by weight NaOH and 2.0 to 6.0% by weight soda waterglass, solids content: 35% by weight (37° to 40° Be)—all percentages by weight based on air-dry wastepaper—at temperatures in the range from 20° to 60° C. The fiber suspensions are then stirred into water or water is added to them so that 0.6 to 1.6% by weight suspensions are obtained. After a residence time of 1 to 2 hours at temperatures of 20° to 60° C., salts of divalent metal cations and also salts of trivalent metal cations, preferably in the form of aqueous solutions, are added either simultaneously or successively, after which 0.1 to 0.5 g, based on air-dry paper stock, $C_{10-22}$ fatty acids, polymers and/or copolymers are optionally added to the suspensions. The suspensions are then preferably subjected to flotation in known manner, for example in a Denver flotation cell.

EXAMPLES

Using a Starmix, stage 2, 15 g air-dry (=13.8 g bone-dry for 8.3% moisture) printed wastepaper (100% newspapers) printed with flexographic printing inks were disintegrated at 45° C. in 390 ml of an aqueous solution containing 0.22% by weight soda waterglass, solids content: 35% by weight (37° to 40° Be), 0.09% by weight hydrogen peroxide, 30% by weight, and 0.04% by weight sodium hydroxide, 99% by weight. The pulp was then diluted with water to 1.38 l and left standing for 1.5 hours at 45° C. First 2.43% by weight aqueous sodium aluminate solution, then 7.4% by weight aqueous magnesium chloride solution and, optionally, $C_{10-22}$ fatty acids, polymers and/or copolymers were added with stirring to quantities of 175 ml of this fiber suspension, followed by flotation for 12 minutes at 45° C. in a Denver laboratory flotation cell (200 ml) at 3,000 r.p.m. For comparison, 175 ml of the fiber suspension mentioned above were added to pre-precipitated layer compound prepared from 3.5 ml 2.43% by weight aqueous sodium aluminate solution, to which 5 ml 7.4% by weight aqueous magnesium chloride solution had been added, after which the suspension was floated for 12 minutes at 45° C. in a Denver laboratory flotation cell (200 ml) at 3,000 r.p.m. After flotation, the pulp was separated from the water on a nutsch filter, formed into a sheet between two filter papers in a photo dry press and dried for 60 minutes at 120° C.

The quantities of divalent and trivalent metal cations and, optionally, additives used and the deinking results of the wastepapers treated with cationic layer compounds precipitated in situ and with pre-precipitated or dry cationic layer compounds are set out in Table 1. The deinkability D (whiteness) of the treated wastepaper was determined by a reflex measurement at 457 nm using a Zeiss Elrepho (remission of the unprinted, non-floated paper=100% D, remission of the printed, non-floated paper=0% D). The quality of the circuit water was determined by transmission measurement using a Metrohm 662 photometer (Metrohm, Herisau/Switzerland); the higher the transmission T in %, the better the quality of the circuit water: 100% T means clear circuit water.

TABLE 1

| Molar ratio $Al^{3+}:Mg^{2+}$ | Quantity of $Al^{3+}$ used in % by weight, based on air-dry paper stock | Addition, % by weight, based on air-dry paper stock | pH value of the paper stock suspension | % D | % T |
| --- | --- | --- | --- | --- | --- |
| 1:5.3 | 1.14 | | 8.2 | 52 | 100 |
| 1:5.3 | 1.71 | | 8.1 | 57 | 100 |
| 1:5.3 | 1.14 | Copolymer[1], 0.2% by weight | 8.3 | 64 | 100 |
| 1:3.5 | 1.14 | | 8.4 | 65 | 100 |
| 1:3.5 | 1.14 | Fatty acid[2], 0.4% by weight | 8.4 | 63 | 100 |
| 1:1.75 | 1.14 | | 8.8 | 67 | 100 |
| 1:1.05 | 1.14 | | 8.9 | 70 | 100 |
| For comparison: | | | | | |
| 1:5.3 Pre-precipitated layer compound | 1.14 | | 8.4 | 40 | 100 |
| 1:2.84 Hydrotalcite[3] | 1.14 | | 9.6 | 40 | 44 |

[1] Copolymer of 78% by weight dimethylaminoethyl methacrylate, 7% by weight methacrylic acid and 15% by weight ethyl acrylate prepared in accordance with DE 38 39 479 (copolymer I)
[2] Olinor ® 4010, a product of Henkel KGaA
[3] Manufacturer: Guilini

We claim:

1. The process of regenerating wastepaper comprising fiberizing said wastepaper in water in the presence of chemicals suitable for detachment of printing ink particles from said wastepaper and form a suspension thereof, treating said suspension with a cationic layer compound precipitated in situ wherein said layer compound comprises the composition $$M(II)_{1-x}M(III)_x(OH)_2(A^{z-})_{x/z} \cdot n\ H_2O$$

in which M(II) represents at least one divalent metal cation, M(III) represents at least one trivalent metal cation and $A^{z-}$ represents anions of a monobasic or polybasic acid, x is a number of about 0.01 to about 0.5, n is a number of 0 to about 20 and z corresponds to the number of charges of said anions, and then removing from said suspension detached printing ink particles, fillers or trash by flotation or washing.

2. The process as in claim 1 wherein M(II) represents a magnesium or calcium cation, M(III) represents an aluminum or iron cation, and A represents a nitrate, chloride, carbonate, sulfate, phosphate or polyphosphate anion.

3. The process as in claim 1 wherein said layer compound precipitated in situ is prepared by adding to said suspension an aqueous salt solution of said divalent metal cation and an aqueous salt solution of said trivalent metal cation.

4. The process as in claim 3 wherein said solution of divalent metal cation and said solution of trivalent metal cation are added to said suspension at a temperature from about 20° to about 60° C.

5. The process as in claim 1 wherein said divalent metal cation is provided by an alkaline earth metal nitrate, chloride, carbonate, sulfate, phosphate, or polyphosphate.

6. The process as in claim 1 wherein said trivalent metal cation is provided by an alkali metal aluminate, sulfate, nitrate, or chloride.

7. The process as in claim 1 wherein said trivalent metal cation is present in an amount of from about 0.3 to about 2 percent by weight, based on the weight of air-dry wastepaper.

8. The process as in claim 1 wherein the molar ratio of said divalent metal cation to said trivalent metal cation is from about 20:1 to about 1:1.

9. The process as in claim 1 wherein the pH value of said suspension is between about 8 and about 10.

10. The process as in claim 9 wherein said pH value is provided by adding an alkali metal hydroxide to said suspension.

11. The process as in claim 1 wherein said chemicals are selected from hydrogen peroxide, sodium hydroxide and sodium silicate.

12. The process as in claim 1 including providing said suspension a residence time of about 1 to about 2 hours prior to said treating step.

13. The process as in claim 1 including adding to said suspension from about 0.1 to about 0.5% by weight of a $C_{10}$–$C_{22}$ fatty acid, an amide, methacrylate or acrylate polymer or copolymer thereof.

14. The process as in claim 1 wherein said wastepaper comprises paper printed with water-dilutable printing inks.

15. The process of regenerating wastepaper comprising fiberizing said wastepaper in water in the presence of an alkali metal hydroxide, sodium silicate and hydrogen peroxide to detach printing ink particles from said wastepaper and form a suspension thereof, providing said suspension a residence time of about 1 to about 2 hours, treating said suspension at a temperature of from about 20° to about 60° C. with a cationic layer compound precipitated in situ wherein said layer compound comprises the composition $$M(II)_{1-x}M(III)_x(OH)_2(A^{z-})_{x/z} \cdot n\ H_2O$$

in which M(II) represents at least one divalent metal cation, M(III) represents at least one trivalent metal cation and $A^{z-}$ represents anions of a monobasic or polybasic acid, x is a number of about 0.01 to about 0.5, n is a number of 0 to about 20 and z corresponds to the number of charges of said anions, and then removing from said suspension detached printing ink particles, fillers or trash by flotation or washing.

16. The process as in claim 15 wherein M(II) represents a magnesium or calcium cation, M(III) represents an aluminum or iron cation, and A represents a nitrate, chloride, carbonate, sulfate, phosphate or polyphosphate anion.

17. The process as in claim 15 wherein said layer compound precipitated in situ is prepared by adding to said suspension an aqueous salt solution of said divalent metal cation and an aqueous salt solution of said trivalent metal cation.

18. The process as in claim 15 wherein the molar ratio of said divalent metal cation to said trivalent metal cation is from about 20:1 to about 1:1.

19. The process as in claim 15 including adding to said suspension from about 0.1 to about 0.5% by weight of a $C_{10}$–$C_{22}$ fatty acid, an amide, methacrylate or acrylate polymer or copolymer thereof.

20. The process as in claim 15 wherein said wastepaper comprises paper printed with water-dilutable printing inks.

* * * * *